United States Patent
Lin

(10) Patent No.: US 6,761,563 B1
(45) Date of Patent: Jul. 13, 2004

(54) INTERACTIVE TEACHING MAT

(76) Inventor: Antony Lin, No. 16, Changshuen St., Changhua City (TW)

( * ) Notice: Subject to any disclaimer, the term of this patent is extended or adjusted under 35 U.S.C. 154(b) by 0 days.

(21) Appl. No.: 10/677,541

(22) Filed: Oct. 2, 2003

(51) Int. Cl.[7] ................................................. G09B 5/00
(52) U.S. Cl. ..................... 434/169; 273/153 R; 446/175
(58) Field of Search ................................ 434/167, 169, 434/171, 259, 335, 337, 406; 273/153 R, 156, 157 R; 446/124, 125, 175, 115, 484

(56) References Cited

U.S. PATENT DOCUMENTS

| | | | | |
|---|---|---|---|---|
| 3,091,454 A | * | 5/1963 | Sam | 473/414 |
| 3,469,325 A | * | 9/1969 | Greenberg | 434/167 |
| 3,800,437 A | * | 4/1974 | Lamberson | 434/339 |
| 4,924,743 A | * | 5/1990 | Tsai | 84/476 |
| 5,212,842 A | * | 5/1993 | Glydon | 5/420 |
| 5,215,490 A | * | 6/1993 | Szoradi | 446/115 |
| D370,818 S | * | 6/1996 | D'Alessio | D6/582 |
| 5,971,761 A | * | 10/1999 | Tillman, Sr. | 434/81 |
| 5,997,304 A | * | 12/1999 | Wood | 434/169 |

FOREIGN PATENT DOCUMENTS

| | | | | |
|---|---|---|---|---|
| GB | 2015801 A | * | 9/1979 | ............ G01H/1/00 |
| GB | 2112990 A | * | 7/1983 | ............ G09B/17/00 |
| GB | 2145341 A | * | 3/1985 | ............ A63H/33/08 |

* cited by examiner

*Primary Examiner*—Jacob K. Ackun
*Assistant Examiner*—Bena Miller
(74) *Attorney, Agent, or Firm*—Alan D. Kamrath; Nikolai & Mersereau, P.A.

(57) ABSTRACT

A teaching mat includes a plurality of parts which are connected with each other and disposed on floor. A first hole is defined through a center of each part and a sound generating member is received in the first hole. At least one second hole is defined in each part and located beside a designation member engaged with the part. A circuit board is received in the at least one second hole and electrically connected to the sound generating member. A conductive spring piece is located in the at least one second hole and a gap is defined between the circuit board and a main body of the conductive spring piece such that when pushing a button engaged with the at least one second hole, the conductive spring piece is lowered to touch the circuit board to generate a specific sound from the sound generating member.

5 Claims, 4 Drawing Sheets

INTERACTIVE TEACHING MAT

FIELD OF THE INVENTION

The present invention relates to a teaching mat having sound generating members located beside designated patterns or words so as to produce desired sound by petting desired position for the patterns or words.

BACKGROUND OF THE INVENTION

A conventional mat used for children generally made of vinyl and can be easily connected with each other so as to lie on the floor for a game room such that the kids will not hurt when falling on the mat. In order to attract the kids, variety of patterns and colors are printed on the mat. Nevertheless, the conventional mat cannot satisfy the needs of teachers or parents who need a teaching mat that catches the attention of the children and have an interactive actions for the children so that the children learn basic phonics when playing games on the mat.

The present invention intends to provide a teaching mat that provides sound generating members below the mat so that when the children touch specific areas, a corresponding sound is produced so that the children learn during playing on the mat.

SUMMARY OF THE INVENTION

In accordance with one aspect of the present invention, there is provided a teaching mat which comprises a plurality of parts and each part has notches and protrusions on each side thereof so as to be easily connected with each other. A first hole is defined through a center of each part and a sound generating member is received in the first hole. At least one second hole is defined in each part and located beside a designation member. A circuit board is received in the at least one second hole and electrically connected to the sound generating member. A conductive spring piece is located in the at least one second hole and a gap is defined between the circuit board and a main body of the conductive spring piece. A button is engaged with the at least one second hole so that the conductive spring piece is lowered to touch the circuit board to generate sound from the sound generating member by pushing the button.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
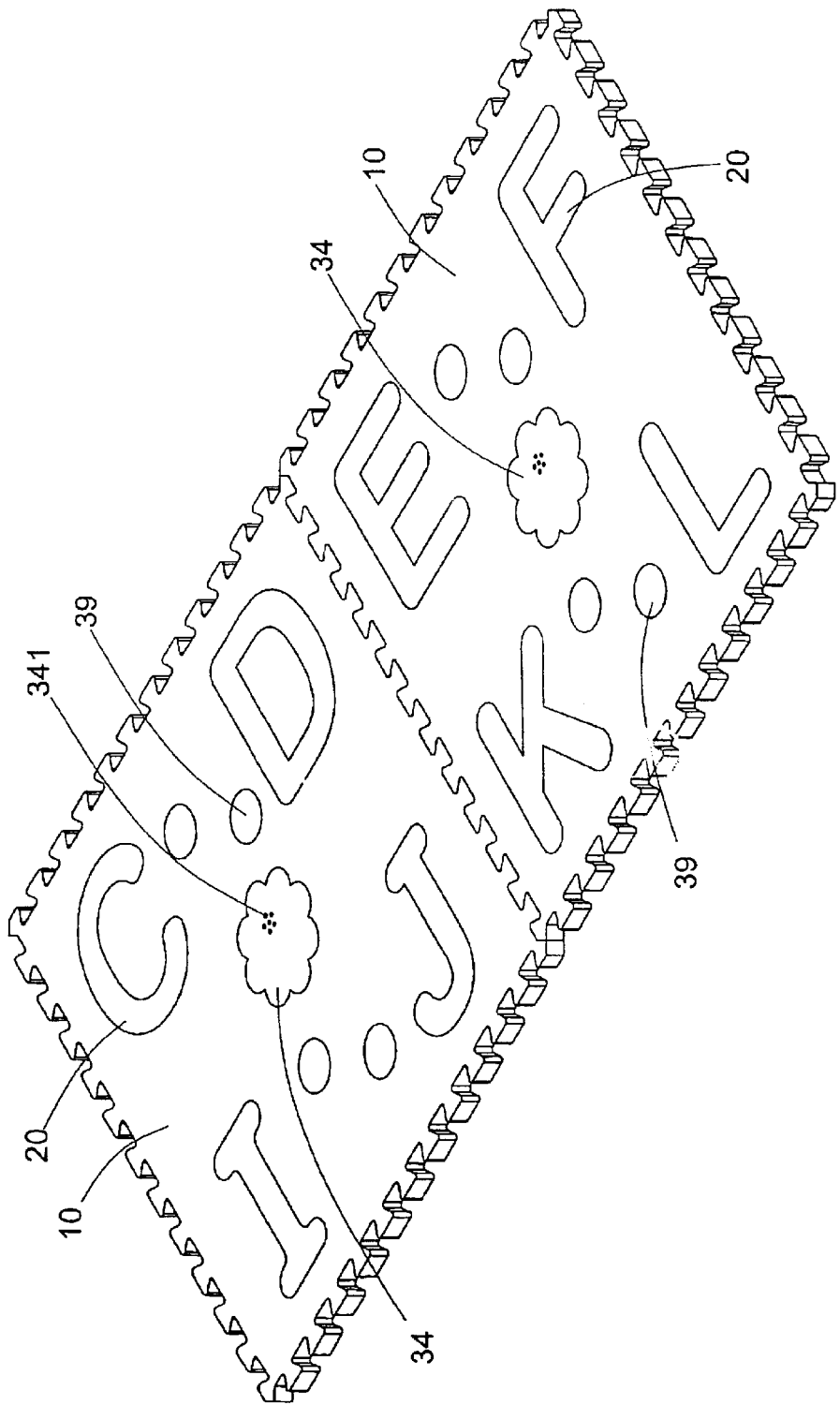
FIG. 1 is a perspective view to show the teaching mat of the present invention.
Figure 2:
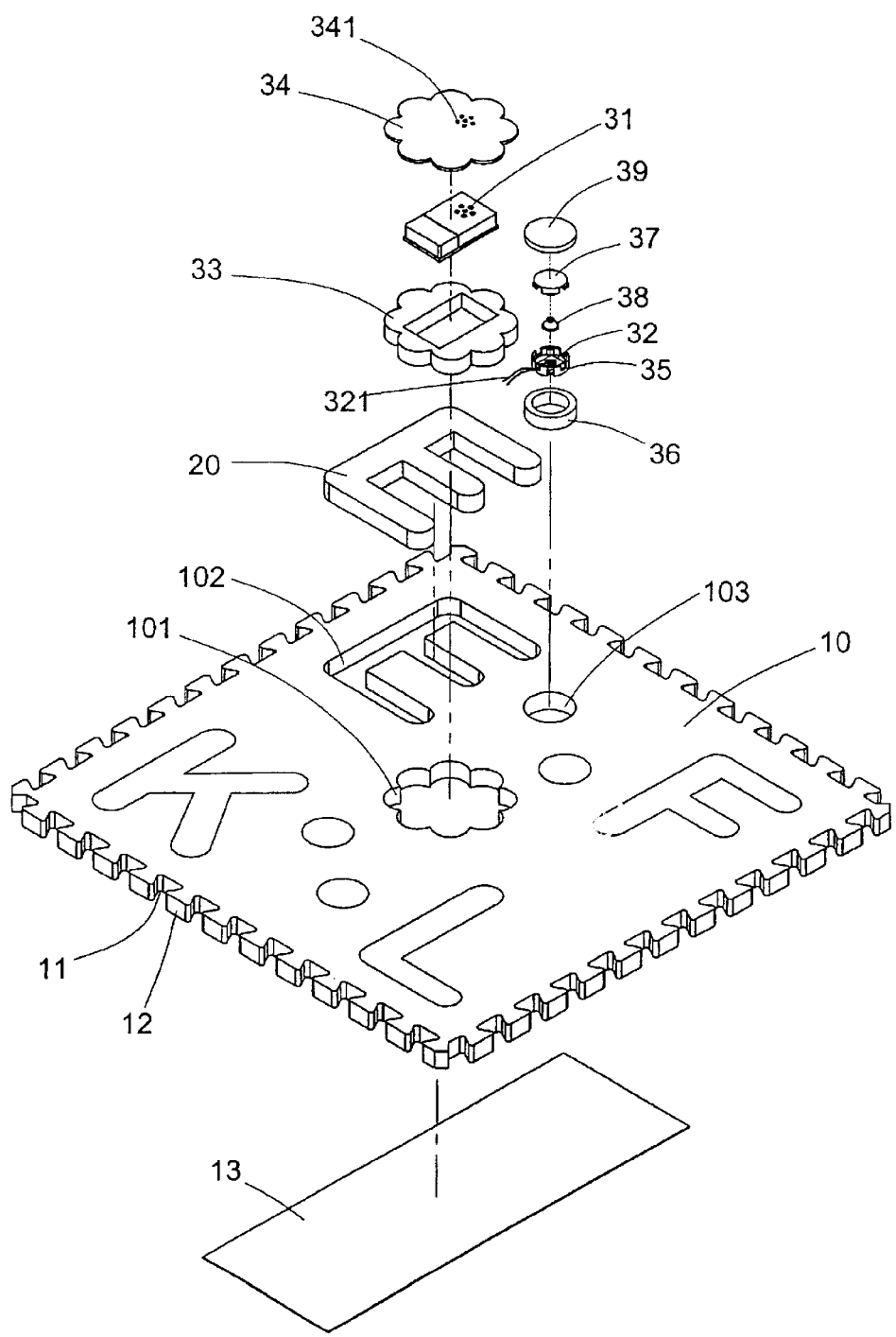
FIG. 2 is an exploded view to show the teaching mat of the present invention.
Figure 3:
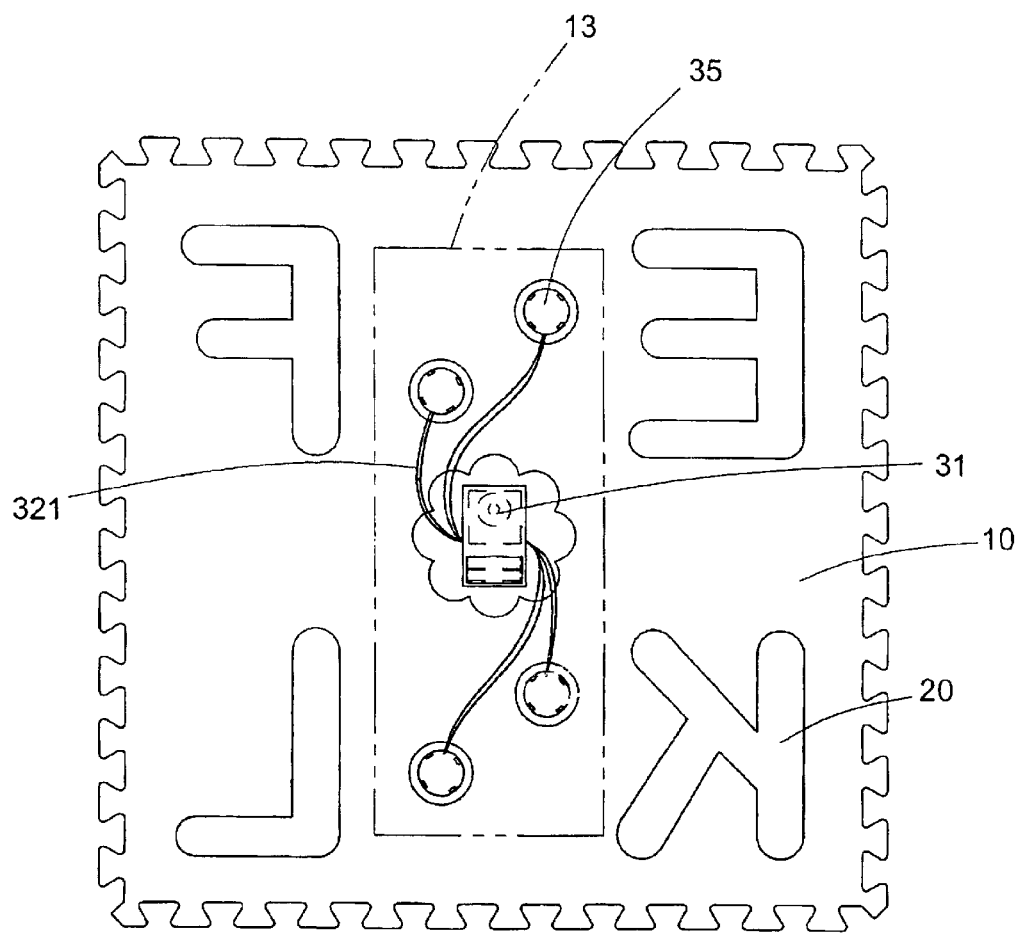
FIG. 3 is a bottom view to show a bottom plate is adhered to a bottom of each part of the teaching mat of the present invention.

Referring to FIGS. 1 to 3, the teaching mat of the present invention comprises a plurality of parts 10 and each part 10 had notches 11 and protrusions 12 on each side thereof so that the parts 10 are easily connected with each other by engaging the protrusions 12 of one part 10 with the notches 11 of the adjacent part 10. A first hole 101 is defined through a center of each part 10 and a base piece 33 is engaged with the first hole 101 and a space is defined in the base piece 33 so that a sound generating member 31 is engaged with the space. A cover piece 34 having a plurality of holes 341 is covered the first hole 101.

Four second holes 103 are defined in each part 10 and respectively located beside a designation member 20 which is engaged with a third hole 102 defined in the part 10. The designation members 20 can be a word, a letter, a specific object or the like. A circuit board 32 is engaged in a ring 35 which is engaged with a circuit member 36 which is securely engaged with each second hole 103. The circuit board 32 in each second hole 103 is electrically connected to the sound generating member 31.

Figure 4:
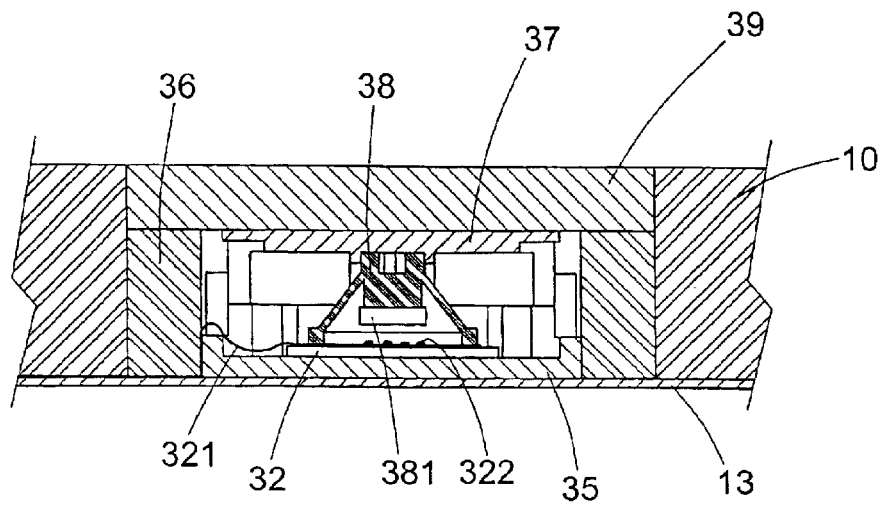
FIG. 4 is a cross sectional view to show the teaching mat of the present invention when the button is not yet pushed.

Further referring to FIG. 4, a conductive spring piece 38 is located in each of the second holes 103 and a gap is defined between the circuit board 32 and a main body of the conductive spring piece 38. A cap 37 is connected to a top of the main body of each of the conductive spring pieces 38 and a button 39 is engaged with each of the second holes 103. A bottom plate 13 is adhered to a bottom of each part 10 and covers the first hole 101 and the second holes 103 so as to avoid from being electric short.

Figure 5:
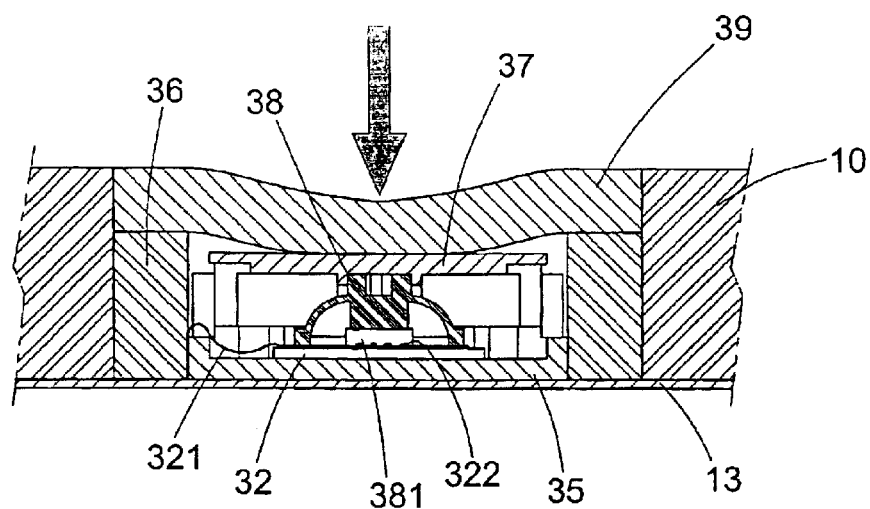
FIG. 5 is a cross sectional view to show the teaching mat of the present invention when the button is pushed.

Referring to. FIG. 5, when the button 39 is pushed the conductive spring piece 38 is lowered to touch the circuit board 32 to generate sound from the sound generating member 31. In other words, if the child pushes the button 39 beside the letter "F", then the pronunciation of the letter "F" is heard by the child. The designation members 20 can be made to be dogs and the sound of barking of dogs can be heard when a correct button is pushed. The teaching mat is more than a mat and provides a lot of fun for the children during playing on the mat.

While we have shown and described the embodiment in accordance with the present invention, it should be clear to those skilled in the art that further embodiments may be made without departing from the scope of the present invention.

What is claimed is:

1. A teaching mat comprising:

a plurality of parts and each part having notches and protrusions on each side thereof, a first hole defined through a center of each part and a sound generating member received in the first hole, at least one second hole defined in each part and located beside a designation member on the part, a circuit board received in the at least one second hole and electrically connected to the sound generating member, a conductive spring piece located in the at least one second hole and a gap defined between the circuit board and a main body of the conductive spring piece, a button engaged with the at least one second hole so that the conductive spring piece is lowered to touch the circuit board to generate sound from the sound generating member by pushing the button.

2. The mat as claimed in claim 1 further comprising a base piece engaged with the first hole and a space defined in the base piece so that the sound generating member is engaged with the space.

3. The mat as claimed in claim 1, wherein the circuit board is engaged in a ring which is engaged with a circuit member which is securely engaged with the at least one second hole.

4. The mat as claimed in claim 1 further comprising a third hole defined in each part and the designation member engaged with the third hole.

5. The mat as claimed in claim 1 further comprising a bottom plate adhered to a bottom of each part and covering the first hole and the at least one second hole.

\* \* \* \* \*